United States Patent [19]

Mawhinney

[11] Patent Number: 4,656,481
[45] Date of Patent: Apr. 7, 1987

[54] CALIBRATION INSTRUMENT FOR CONTINUOUS WAVE MICROWAVE DOPPLER RADAR

[75] Inventor: Daniel D. Mawhinney, Livingston, N.J.

[73] Assignee: RCA Corporation, Princeton, N.J.

[21] Appl. No.: 637,141

[22] Filed: Aug. 2, 1984

[51] Int. Cl.⁴ .............................................. G01S 7/40
[52] U.S. Cl. .................................... 342/171; 128/687; 73/2
[58] Field of Search ...................... 343/17.7; 73/10, 2; 310/322, 334; 84/409; 128/687, 661, 663; 357/157; 342/169, 170, 171

[56] References Cited

U.S. PATENT DOCUMENTS

| | | | |
|---|---|---|---|
| 3,277,477 | 10/1966 | Evans | 343/17.7 |
| 3,922,572 | 11/1975 | Cook et al. | 367/157 X |
| 3,955,198 | 5/1976 | Delzer | |
| 4,005,424 | 1/1977 | Fetter | |
| 4,037,121 | 7/1977 | Nakamura et al. | 84/409 X |
| 4,163,234 | 7/1979 | Beno et al. | 343/17.7 |
| 4,168,502 | 9/1979 | Susie | 343/17.7 |
| 4,180,816 | 12/1979 | Endo et al. | |
| 4,513,748 | 4/1985 | Nowogrodzki et al. | 128/687 X |

Primary Examiner—T. H. Tubbesing
Assistant Examiner—Mark Hellner
Attorney, Agent, or Firm—Joseph S. Tripoli; Robert L. Troike; Raymond E. Smiley

[57] ABSTRACT

A calibration instrument for calibrating a continuous wave microwave doppler radar includes a piezoelectric sounder and means to energize the sounder to produce an acoustic signal to simulate motion of a body to the radar.

2 Claims, 1 Drawing Figure

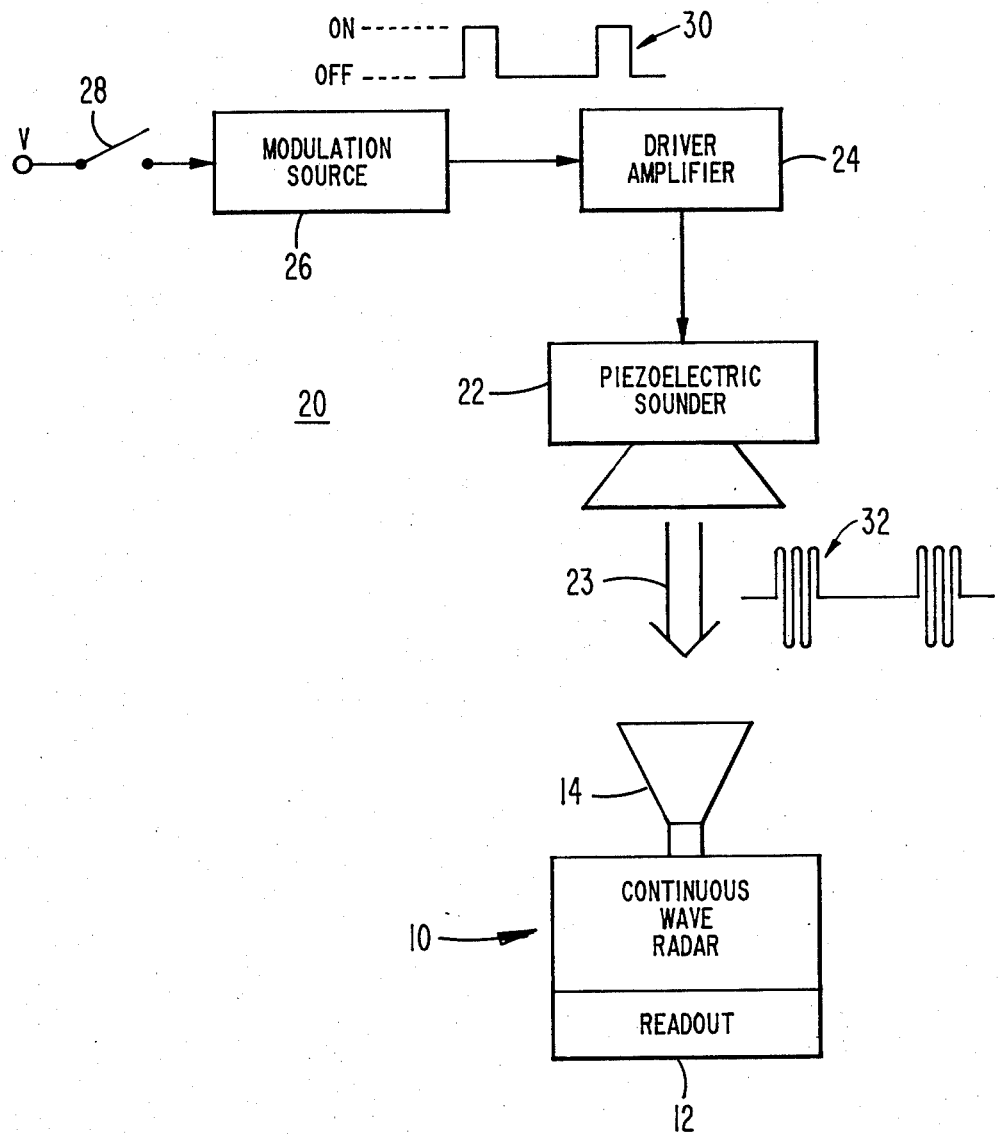

CALIBRATION INSTRUMENT FOR CONTINUOUS WAVE MICROWAVE DOPPLER RADAR

The Government has rights in this invention pursuant to Contract No. DAMD17-83-C-3018, awarded by the Department of the Army.

This invention relates to doppler radar calibration instruments, and more particularly, to modulatable mechanical vibrator calibration instruments.

BACKGROUND OF INVENTION

It is known to test a continuous wave microwave doppler radar using a tuning fork designed to resonate at a given frequency to simulate a given speed of a moving object. Tuning forks eventually lose calibration particularly if damaged and need to be re-calibrated or replaced. Furthermore, a tuning fork is not easily modulatable in being able rapidly to be turned on or off. It is also known that some radars have built in calibration devices which can produce an electronic signal of a predetermined frequency. Such a calibration instrument can be easily turned on or off but it does not test the entire doppler radar system including the radar antenna.

SUMMARY OF INVENTION

A calibration instrument for calibrating a continuous wave microwave doppler radar comprises: a means producing an acoustic signal at a known frequency when energized and means producing an electrical signal for energizing the acoustic signal producing means to produce the acoustic signal, whereby the acoustic signal produced by the means when energized may be used to calibrate the radar.

BRIEF DESCRIPTION OF THE DRAWING

The sole FIGURE is a calibration instrument in block diagram form for calibrating a continuous wave microwave radar.

DETAILED DESCRIPTION

In the sole FIGURE continuous wave radar 10 including a readout portion 12 and transceiver antenna 14 may be a continuous wave (doppler shift measuring) microwave radar of conventional design. One such radar is the so-called police speed radar.

Optionally, radar 10 may be useful for measuring heart rate of a patient where a movement of the heart is equivalent to the motion of a vehicle except that the heart alternates periods of motion with periods of rest. A continuous wave radar suitable for measuring heart rate differs from one used to measure vehicle speed in that the pulse envelope of the doppler signal produced by the periodic abrupt heart movements is processed by counting against an accurate time base or the interval between pulses timed to provide a pulse rate count whereas the vehicle speed is determined directly from measuring doppler frequency produced by the relatively uniform motion of the vehicle in accordance with the well known doppler frequency shift equation.

The calibration instrument 20 for calibrating radar 10 comprises a piezoelectric sounder 22 or other means generating an acoustic signal at a known frequency, a driver amplifier 24 and optionally a modulation source 26. Modulation source 26 is selectively connected to a suitable energy source V by means of a switch 28. An exemplary piezoelectric sounder 22 is the model PKB-5-340 manufactured and sold by Murata Erie North America, Marietta, Ga. 30067. Sounder 22 when energized produces acoustic signals as indicated by arrow 23. Waveform 28 illustrates a typical output signal from modulation source 26 with the horizontal axis representing time and the vertical axis representing amplitude.

When used for simulation of heart beat, modulation source 26, for example, may produce pulses having a period of 0.5 seconds (leading edge one pulse to leading edge of the next pulse) with a pulse-on time of 250 milliseconds. Such a signal represents a heart rate of 120 beats per minute (1/0.5 pulses/second·60 seconds/minute=120). When operated in this pulsed mode, the sounder produces a "beep" sound similar to medical heart monitoring equipment.

The signal produced by modulation source 26 causes driver amlifier 24 to turn off and on at the rate indicated by waveform 30. Amplifier 24 may simply be a transistorized amplifier for accepting low current signals typically produced by modulation source 26 and converting them to the relatively high current signal needed to drive piezoelectric sounder 22.

The acoustic signal produced by piezoelectric sounder 22 is as illustrated in waveform 32. The signal comprises pulses of acoustic sound at the natural frequency of piezoelectric sounder 22 alternating with periods of no acoustic signal being produced by sounder 22. The on-time and pulse-to-pulse time of the acoustic signals is the same as the pulse width of signal produced by modulation source 26, that is, typically 250 milliseconds, and the pulse to pulse timing, typically 0.5 seconds, respectively. The frequency of signal produced by sounder 22 when activated is typically 2800 hertz. In a typical police radar operating at 10.5 GHz this is equivalent of 90 miles per hour.

Operation of calibration source 20 is as follows. Piezoelectric sounder 22 is positioned such as to direct acoustic sound toward antenna 14 of energized continuous wave radar 10. Then switch 28 is closed causing modulation source 26 to produce a suitable on and off electrical signal pattern as illustrated by waveform 30 causing piezoelectric sounder 22 to emit an acoustic signal as illustrated by waveform 32. Then the person performing the calibration looks at read-out 12 of radar 10 to confirm that the read-out is as expected.

In the case of either a heart rate monitor or a police radar, for example, the read-out may consist both of a visual presentation and an acoustic representation. With the output signal from piezoelectric sounder 22 as illustrated by waveform 32 the acoustic sound is that of a heart beat as heard, for example, with a stethoscope.

Thus, a medical technician who is experienced in listening to a heart beat through a stethoscope will recognize a similar sort of signal being produced from read-out 12 and will be able to easily identify any misoperation which would be indicative of a failed radar 10.

When used with other radar devices such as for example police radar a modulation source 26 may simply produce a continuous voltage signal to drive piezoelectric sounder 22 continuously. In that case the frequency of the piezoelectric sounder is of importance and the frequency determines the speed indication produced on read-out 12. Thus, for example, as previously mentioned, with a piezoelectric sounder frequency of 2800 hertz, a read-out indicating 90 miles per hour speed is to be expected on radar 10. Any deviation from the desired speed is indicative of an error in the operation of radar 10 and it constitutes grounds for having the radar repaired.

Unlike the conventional tuning fork used to produce police radar which tuning fork can be damaged and therefore change frequency, the frequency of piezoelectric sounder 22 is fixed and the only expected failure mode would be a complete failure of sounder 22 which would be obvious to an operator since the normal sound produced by sounder 22 is an acoustic one easily heard by the person doing the calibration.

What is claimed is:

1. A calibration instrument for calibrating a continuous wave microwave doppler radar, said radar being of the type utilized to check the heart rate of a patient, said radar having an antenna means for transmitting continuous wave signals and receiving doppler shifted continuous wave signals, comprising in combination:

a piezoelectric sounder producing an acoustic signal at a known frequency only when energized with an electrical signal and physically arranged in operating relationship with said antenna of said continuous wave radar; and means producing said electrical signal including means for producing a signal simulating the heart rate of a patient, said signal for alternately energizing and not energizing said piezoelectric sounder in a manner to simulate a patient heart rate for energizing said acoustic signal producing means to produce an acoustic signal which is directed toward said radar antenna whereby the acoustic signal produced by said means when energized may be used to calibrate said radar.

2. The combination as set forth in claim 1 wherein said means producing said electrical signal includes means for producing energy pulses for operating said piezoelectric sounder, said pulses being separated by a distance which is at least several times the width of each produced energy pulse.

* * * * *